US012804234B2

(12) United States Patent

Chandrashekar et al.

(10) Patent No.: US 12,804,234 B2

(45) **Date of Patent: *Nov. 17, 2026**

(54) KEY EVENT TRICK-PLAY OPERATION

(71) Applicant: Adeia Guides Inc., San Jose, CA (US)

(72) Inventors: Padmassri Chandrashekar, Bangalore (IN); Daina Emmanuel, Bangalore (IN); Cato Yang, San Jose, CA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/256,538

(22) Filed: Jul. 1, 2025

(65) Prior Publication Data

US 2025/0337992 A1 Oct. 30, 2025

Related U.S. Application Data

(63) Continuation of application No. 18/072,906, filed on Dec. 1, 2022, now Pat. No. 12,375,768, which is a continuation of application No. 17/558,024, filed on Dec. 21, 2021, now Pat. No. 11,546,666.

(51) Int. Cl.

| | |
|---|---|
| ***H04N 21/472*** | (2011.01) |
| ***H04N 21/431*** | (2011.01) |
| ***H04N 21/435*** | (2011.01) |
| ***H04N 21/44*** | (2011.01) |
| ***H04N 21/45*** | (2011.01) |
| ***H04N 21/8547*** | (2011.01) |

(52) U.S. Cl.

CPC ... *H04N 21/47217* (2013.01); *H04N 21/4312* (2013.01); *H04N 21/435* (2013.01); *H04N 21/44008* (2013.01); *H04N 21/4532* (2013.01); *H04N 21/8547* (2013.01)

(58) Field of Classification Search

None

See application file for complete search history.

(56) References Cited

U.S. PATENT DOCUMENTS

2014/0157307 A1* 6/2014 Cox ................. H04N 21/47214 725/34

2014/0245463 A1* 8/2014 Suryanarayanan ..... G06F 21/10 726/28

* cited by examiner

*Primary Examiner* — James R Marandi

(74) *Attorney, Agent, or Firm* — HG LAW LLP

(57) ABSTRACT

Systems and methods are presented herein for generating at least one preview of a portion of a content item, wherein the at least one preview is selectable and, when selected, enables a user to change to a playback position of the at least one preview. An input corresponding to a request to generate at least one preview of a portion of a content item is received. At least two key events corresponding to the portion of the content item is identified. In response to identifying the at least two key events, at least one interactive thumbnail corresponding to the at least two key events is generated, wherein the icon corresponds to a preview of the portion of the content item.

20 Claims, 7 Drawing Sheets

KEY EVENT TRICK-PLAY OPERATION

CROSS-REFERENCE TO RELATED APPLICATIONS

This patent application a continuation of U.S. patent application Ser. No. 18/072,906, filed Dec. 1, 2022, which is a continuation of U.S. patent application Ser. No. 17/558,024, filed Dec. 21, 2021, now U.S. Pat. No. 11,546,666, which are hereby incorporated by reference herein in their entireties.

BACKGROUND

The present disclosure is directed to systems and methods for providing selectable options to change a currently viewed portion of a content item, and more particularly, to systems and methods that generate selectable icons that correspond to various key events within a content item that, when selected, determine which portion of the content item will be displayed for viewing.

SUMMARY

In some current systems, viewing progress can be monitored by a progress bar which indicates a time stamp within a content item that corresponds to a current scene or segment being viewed. Progress bars can often be selected at various positions along the progress to determine which scene or segment is displayed for playback. These progress bars are deficient, however, in that a user must manually scan and select positions along the progress bar to identify a preferred progress point to resume playback of the content item.

Other approaches incorporate scene previews via thumbnails along different portions of the progress bar. For example, a user may move a cursor to a position along the progress bar and a thumbnail may be generated of a particular frame corresponding to a time stamp at or in close proximity to the cursor position along the progress bar. These approaches are also deficient in that a user must still manually scan along the progress bar, decide based on the individual thumbnail of the individual frame whether the position along the progress bar is where the user would like to resume playback, and then must select the position along the progress bar. As with the previously described approach, these approaches with the included thumbnails do not provide a user with a complete preview of where in the content item the user is resuming playback. This often leads to a user selecting a position and then skipping forwards or backwards to get to an ideal progress point in the content item.

Described herein are systems and methods for providing selectable icons for modifying a playback position in a content item, wherein the selectable icons comprise at least one of a description or visual indication of a portion of the content item corresponding to key sections or scenes of the content item.

In some embodiments, an input is received corresponding to a request to generate at least one preview of a portion of a content item. At least two key events corresponding to the portion of the content item are identified. In response to identifying the at least two key events, at least one interactive thumbnail corresponding to the at least two key events is generated, wherein the icon corresponds to a preview of the portion of the content item. The at least two key events are required to provide a user additional context for each key event and provides a user with more options to recall which portion of the content item the user last viewed or last remembers viewing.

These techniques help to address the problems of other approaches described above. In particular, this approach does not rely on a user manually selecting a position on a playback progress bar or performing a trick-play operation to find a scene the user wishes to view. Thus, a user may provide a single command to generate highlight or key event icons as they appear throughout the content item, and the user can decide at which progress point the user wishes to resume playback of the content item. Additionally, this approach does not require a content item to be analyzed for images or other data related to each scene in order to generate a preview of a particular progress point in a content item. By identifying key events during playback, as opposed to analyzing data corresponding to the content item while the content item is identified on a server, the system can identify key events based at least in part on user preferences (e.g., if a user has a viewing history of selecting action scenes to watch, the system may identify action scenes in the content item.

In some embodiments, receiving the input comprises determining the content item is selected for playback. A selection of an icon corresponding to a command to generate the at least one preview of a respective portion of the content item is received. In response to receiving the selection of the icon, an instruction to identify the at least two key events is transmitted such that at least one preview for each of the at least two key events may be generated.

In some embodiments, receiving the input comprises determining the content item is selected for playback and receiving a selection of a trick-play operation icon. In response to receiving the selection of the trick-play operation, transmitting an instruction to identify the at least two key events.

In some embodiments, identifying the at least two key events comprises identifying, based on metadata corresponding to the content item, at least one primary character and identifying at least one scene corresponding to the at least one primary character.

In some embodiments, identifying the at least two key events comprises performing deep video analysis of each of a plurality of frames of the content item to identify frames corresponding to at least one primary character, wherein the at least one primary character is identified by determining the at least one primary character appears in a highest number of the plurality of frames as compared to other characters in the content item. At least one scene, or at least two portions of at least one scene, comprised of a portion of the plurality of frames that the primary character appears in is identified, and each portion of the plurality of frames is determined to correspond to each of the at least two key events.

In some embodiments, identifying the at least two key events comprises identifying, based on metadata corresponding to the content item, at least one primary scene associated with at least one of a trailer or a primary narrative event corresponding to the content item.

In some embodiments, the at least one interactive thumbnail comprises descriptive information corresponding to each of the at least two key events.

In some embodiments, the descriptive information comprises at least one of a string of characters, at least one image corresponding to at least one frame of the portion of the content item, and a video corresponding to a subset of frames associated with the portion of the content item.

In some embodiments, generating the at least one interactive thumbnail comprises retrieving, from a plurality of frames corresponding to the at least two key events, a plurality of images. In response to retrieving the plurality of images, the plurality of images are arranged based on time stamps corresponding to each of the plurality of images in a sequential order for display in a portion of an overlay over the content item.

In some embodiments, generating the at least one interactive thumbnail comprises identifying a scene from a trailer associated with the portion of the content item. The scene from the trailer is presented for display in portion of an overlay over the content item.

In some embodiments, the at least two key events corresponds to a time stamp different from a current playback position and wherein the time stamp is identified based on a setting which defines at least one of whole minute intervals or partial minute intervals.

In some embodiments, identifying the at least two key events comprises identifying a user profile corresponding to the input and determining, based on the user profile, viewing preferences associated with the user profile. In response to determining the viewing preferences, the at least two key events are identified based on the viewing preferences.

BRIEF DESCRIPTIONS OF THE DRAWINGS

The above and other objects and advantages of the disclosure may be apparent upon consideration of the following detailed description, taken in conjunction with the accompanying drawings, in which.

DETAILED DESCRIPTION

Methods and systems are provided herein for providing selectable options to change a currently viewed portion of a content item, wherein each of the selectable options comprises selectable icons that correspond to various highlights or key events within a content item.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media cards, register memory, processor caches, Random Access Memory (RAM), etc.

Figure 1:
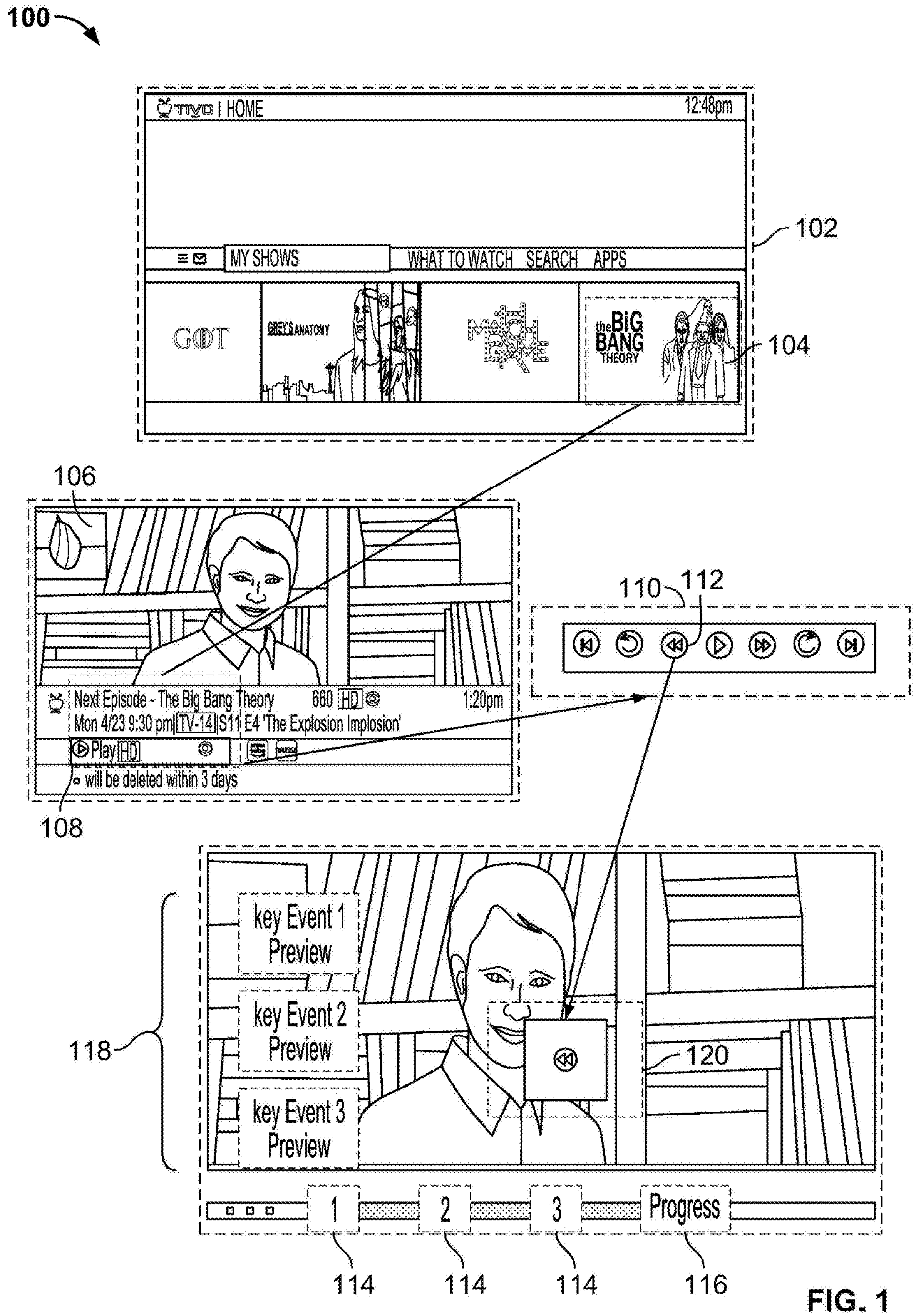
FIG. 1 is an example scenario in which a content item is selected for playback and key event selectable icons are generated in response to a request for a trick-play operation, in accordance with some embodiments of the disclosure.

FIG. 1 depicts content key event identification scenario 100 in which a content item is selected for playback and key event selectable icons are generated in response to a request for a trick-play operation, in accordance with some embodiments of the disclosure. Scenario 100 may be executed by any or all of the components depicted in FIGS. 1-7 or described in reference to FIGS. 1-7. Scenario 100 may comprise all or fewer of the steps described herein, including example alternative embodiments described herein. Scenario 100 may be executed in part with any or all of process 200 of FIG. 2, process 400 of FIG. 4, and process 600 of FIG. 6.

Content platform interface 102 corresponds to a display of a computing device configured to generate selectable options for content items available through a content platform associated with content platform interface 102. For example, a content platform may be able to access a plurality of content items through a broadcasting service or a server for user access through content platform interface 102. Selectable content icon 104 corresponds to at least one content item available for consumption via content platform interface 102. Interactive thumbnail 104 provides descriptive information about the content that interactive thumbnail 104 represents (e.g., a title, an image, and/or other descriptive information corresponding to the selectable content item). When interactive thumbnail 104 is selected, content display 106 is generated. Content display 106 corresponds to a playback instruction for the content item identified by selectable content icon 104 while also generating playback menu 108.

Playback menu 108 when selected may generate playback options 110. Playback options 110 may comprise options such as a scene skip forward or backwards option, a play/pause option, and at least one trick-play option. Trick-play option 112 corresponds to a trick-play command to change a current playback position for content display 106 to a preceding playback position. When trick-play option 112 is selected, key event options 118 are generated as an overlay over content display 106, and playback menu 108 is modified to display a progress bar that indicates current progress point 116 as well as key event playback positions 114. Each of key event playback positions 114 are in the direction of trick-play option 112 relative to current progress point 116, which is also indicated by trick-play overlay 120. As shown, if trick-play option 112 corresponds to a trick-play command to change a current playback position for content display 106 to a preceding playback position, then each of key event playback positions 114 is generated for display preceding current progress point 116. If trick-play option 112 corresponds to a trick-play command to change a current playback position for content display 106 to a following playback position, then each of key event playback positions 114 would be generated for display after current progress point 116 along the progress bar (not depicted in FIG. 1). As shown in FIG. 1, key event playback positions 114 may be correlated as depicted on a progress bar with key event options 118, wherein each of key event playback positions 114 is replicated as a respective key event previews as part of key event options 118.

Each of key event options 118 is selectable and provide descriptive information corresponding to each key event identified in the content item selected for playback in the direction of trick-play option 112. For example, a content item may not have key events prior to current progress point 116. In this example, no key event options 118 may be generated. In some embodiments, a recommendation for an identified key event may be a generated selection with information indicating a relative position of the key event that is in a playback position int the opposite direction of the trick-play option. For example, if a rewind or fast forward command is selected and there is a key event after the current progress point but not prior to the current progress point, then a recommendation may be generated for the key event after the current progress point.

In some embodiments, each of key event options 118 comprises at least one of an image of a respective key event, a plurality of images of a respective key event, a clip of a respective key event, a time stamp in the content item of the key event, and/or a description comprising a string of characters identifying aspects corresponding to the key event (e.g., characters or actors present, a scene description, or a narrative portion corresponding to a narrative followed by the content item). The key events used to generate each of key event options 118 may be identified by a plurality of processes.

In some embodiments, each of the key events may be identified based on metadata corresponding to the content item. For example, the metadata may indicate at least one primary character. At least one scene corresponding to the at least one primary character may be identified as a key event. In some embodiments, a narrative is defined by the metadata or other descriptive information corresponding to the content item. Key events are extracted from the narrative that indicate an impact on the at least one primary character. The impact may comprise a life event, a change to a character associated with the at least one primary character, a change in emotions conveyed, a high frame rate (e.g., indicating an action scene or a chase scene), a change in appearance, or a significant dialogue.

In some embodiments, the at least two key events are identified by performing deep video analysis of each of a plurality of frames of the content item to identify frames corresponding to at least one primary character. The at least one primary character may be identified by determining that the at least one primary character appears in a highest number of the plurality of frames as compared to other characters in the content item. At least one scene comprised of a portion of the plurality of frames that the primary character appears in is identified, and the portion of the plurality of frames may be determined to correspond to at least two key events. In some embodiments, identifying the at least two key events comprises identifying, based on metadata corresponding to the content item, at least one primary scene associated with at least one of a trailer or a primary narrative event corresponding to the content item. For example, the content platform may provide a trailer with each content item icon and may generate the trailer based on at least one of the key events in the content item. In some embodiments, the key events are identified by metadata attached by a distributor or server corresponding to the source of the content. As the content item is provided for access, the metadata is identified and used to draw descriptive information (e.g., images, clips, strings of characters) from the content item to generate each respective key event.

In some embodiments, the analysis for identifying a key event may be performed prior to the content item being displayed for playback. For example, a content-providing service may have libraries of key events for each available content item which are accessed or provided when a key event identification request is identified. The key event identification request may comprise the selection of a trick-play operation, a verbal request for the identification of key events, a selection of an option on a portion of content platform interface 102, or the enabling of automatic identification of key events for at least one profile able to access content platform interface 102. In some embodiments, the analysis for identifying a key event may be performed while the content item is being displayed for playback.

In some embodiments, a second device may be utilized to access or provide data which may be used to identify and display particular highlight points, critical events, or key events. For example, a content streaming device may have access to data from a phone, a wearable computing device, or camera which tracks a user's viewing of the content stream device. Each of the devices may be mined for data indicative of a user not viewing or listening to a content item based on evidence of a distraction or data indicative that the user was distracted or not even present for a portion of the content item. Data indicating that a user received and answered a phone call, email, text message, or some other data from separate end user device other than the content streaming device corresponds to an interruption. Other examples of interruptions for triggering the key event analysis include an indication from a smart doorbell or camera that there is someone at the door, an indication that an alarm has been triggered, or a device sourced notification indicating a user must leave and attend to a task (e.g., checking an oven).

Figure 2:
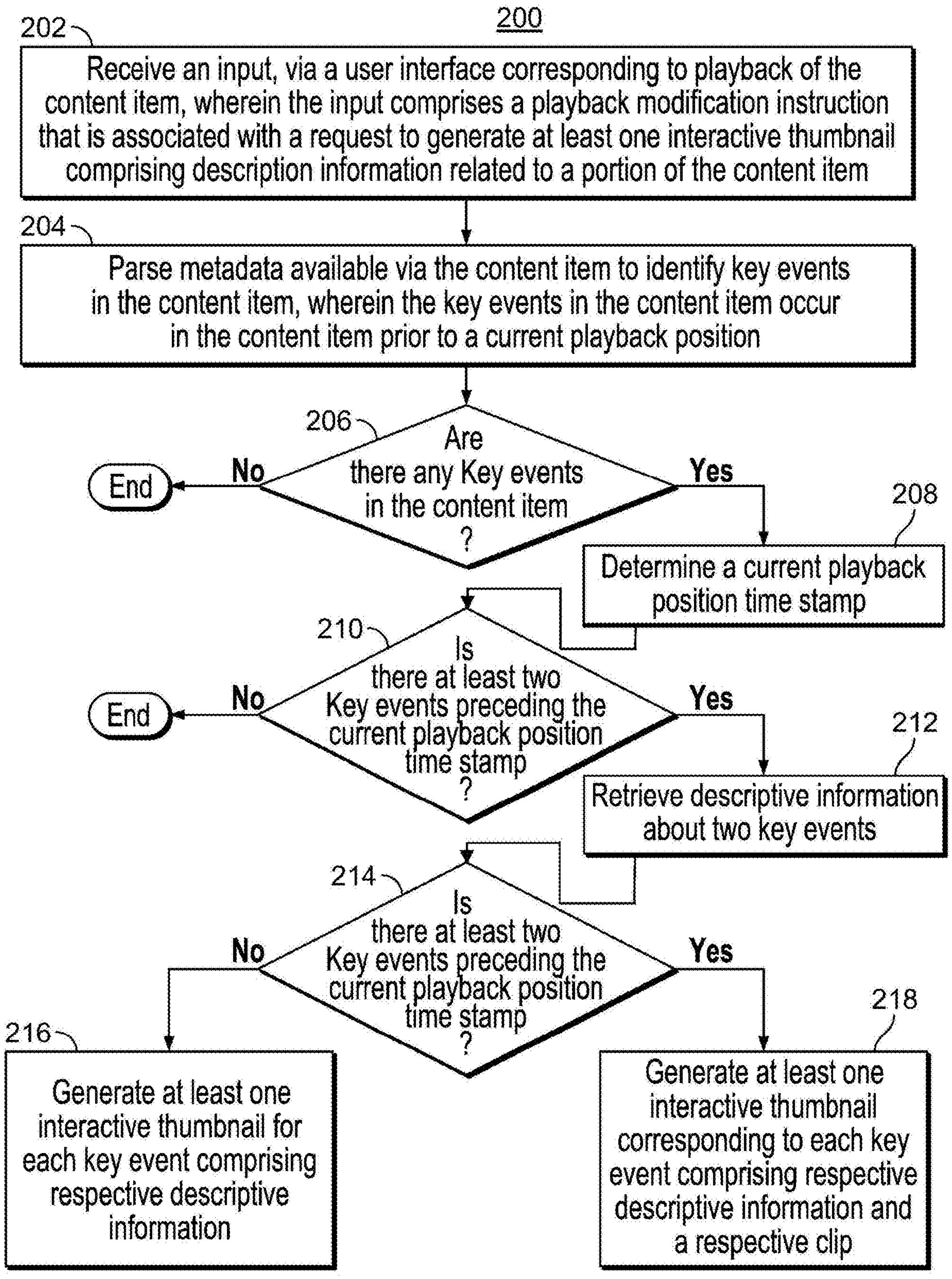
FIG. 2 is a flowchart representing an illustrative process for generating key event selectable icons, in accordance with some embodiments of the disclosure.

FIG. 2 is a flowchart depicting icon generation process 200 for generating selectable icons for key event in a content item, in accordance with some embodiments of the disclosure. Process 200 may be executed by any or all of the components depicted in FIGS. 1 and 3-7 described in reference to FIGS. 1 and 3-7. Process 200 may comprise all or fewer of the steps described herein, including example alternative embodiments described herein. Process 200, or any steps described therein, may be incorporated into process 400, process 600, or vice versa.

At 202, an input is received, via a user interface corresponding to playback of the content item, wherein the input comprises a playback modification instruction that is associated with a request to generate at least one interactive thumbnail comprising description information related to a portion of the content item. The input may comprise a verbal input, an icon input, a string of characters input, or an input from a device that is communicably coupled to a display where a content item from a content source may be displayed. The display may be configured to accommodate a plurality of input types. The controls may include combinations of physical button presses, touch screen inputs, keyboard inputs, pointing device controls, for instance. One aspect includes determining media device control capabilities (e.g., physical buttons and/or a touch screen) and mapping control inputs to cause the media device to display a highlight-based or key event-based user interface and to navigate through various highlight points or key events and select a desired highlight point or event to jump to and play from. In one example, an example control input to display the UI may include a double-click or long-press on a rewind or fast forward button or portion skip icon. In response to the particular control input, the media device displays a first group of highlight points, and corresponding thumbnail images, from a first period defined as being greater than a first time threshold (e.g., 1 minute, because the 10 sec scan functionality is generally satisfactory for shorter time frames), and less than a second time threshold (e.g., 5 minutes).

At 204, metadata corresponding to the content item is parsed to identify key events in the content item, wherein the key events in the content item occur in the content item prior to a current playback position. If it is determined that there are not any key events in the content item corresponding to the request (NO at 206), then the process ends. If it is determined that there are any (e.g., at least two) key events in the content item (YES at 206), then a current playback position time stamp is determined at 208. If it is determined that there are not at least two key events in the content item at a time stamp different preceding the current playback position time stamp (NO at 210), then the process ends. If it is determined that there are at least two key events in the content item at a time stamp preceding the current playback position time stamp (YES at 210), then descriptive information about the at least two key events is retrieved at 212. For example, descriptive information may comprise at least one of a string of characters and at least one image. If it is determined there is not a clip of each key event (NO at 214), then at least one interactive thumbnail corresponding to the event in the descriptive information is generated at 216. If it is determined there is a clip of each of the at least two the key events (YES at 214), then at least one interactive thumbnail corresponding to the event in the descriptive information and the clip is generated at 218.

Figure 3:
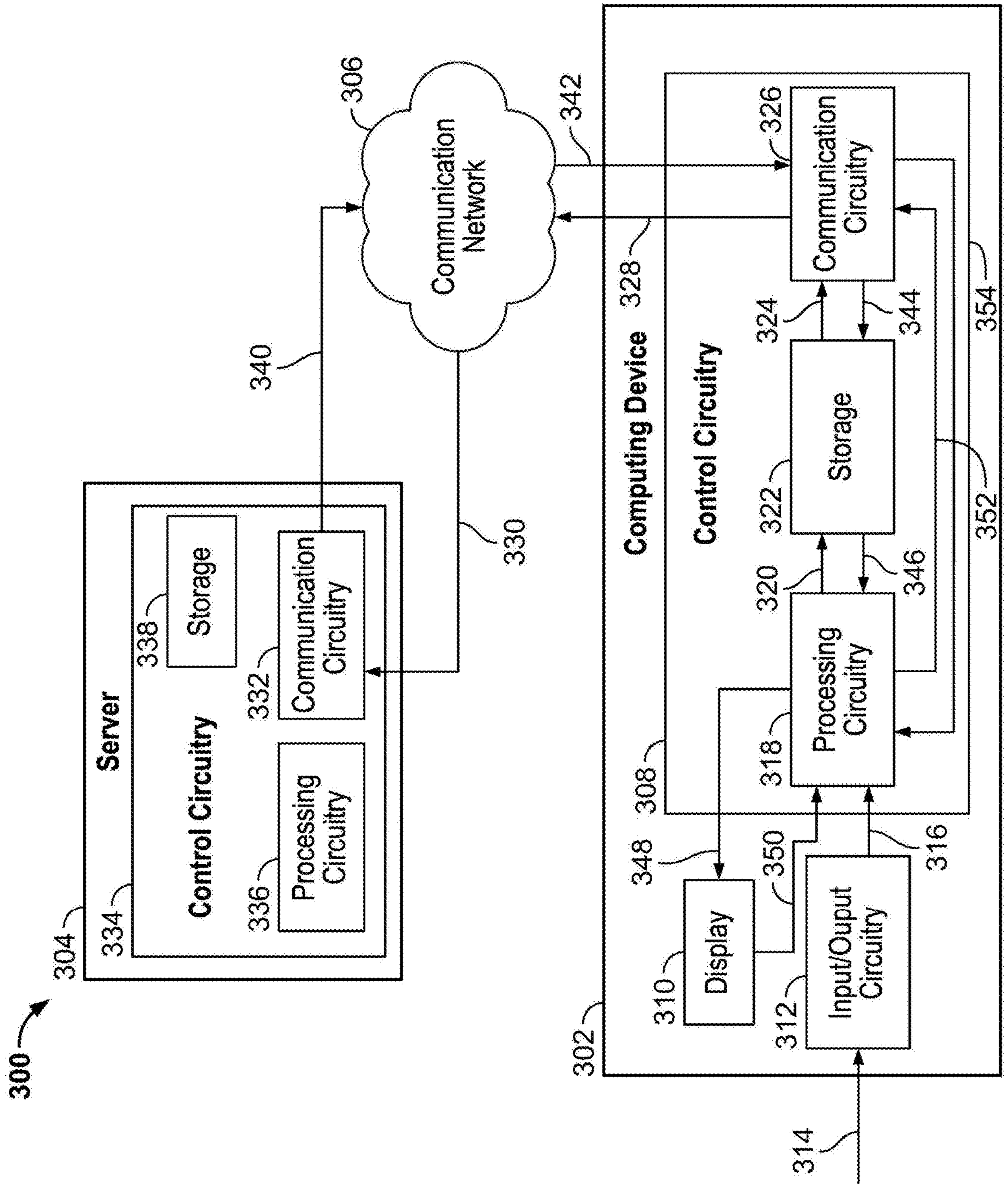
FIG. 3 is a block diagram representing an example key event interactive thumbnail generation system, in accordance with some embodiments of the disclosure.

FIG. 3 depicts illustrative key event interactive thumbnail generation system 300, in accordance with some embodiments of the disclosure. In some embodiments, one or more parts of or the entirety of the interactive system may be configured as a system implementing various features, processes, and components of FIGS. 1, 2, and 4-7. Although FIG. 3 shows a certain number of components corresponding to system 300, in various examples, the interactive system may include fewer than the illustrated number of components and/or multiples of one or more of the illustrated number of components (e.g., multiple iterations of computing device 302 for each device in the system with a display and or multiple iterations of server 304).

The interactive system is shown to include computing device 300, content server 302, and a communication network 306. It is understood that while a single instance of a component may be shown and described relative to FIG. 3, additional instances of the component may be employed. For example, content server 302 may include, or may be incorporated in, more than one server. Similarly, communication network 306 may include, or may be incorporated in, more than one communication network. Content server 302 is shown communicatively coupled to computing device 300 through communication network 306. While not shown in FIG. 3, content server 302 may be directly communicatively coupled to computing device 300, for example, in a system absent or bypassing communication network 306.

Communication network 306 may comprise one or more network systems, such as, without limitation, Internet, LAN, WiFi or other network systems suitable for audio processing applications. In some embodiments, the system of FIG. 3 excludes content server 302, and functionality that would otherwise be implemented by content server 302 is instead implemented by other components of the system depicted by FIG. 3, such as one or more components of communication network 306. In still other embodiments, content server 302 may work in conjunction with one or more components of communication network 306 to implement certain functionality described herein in a distributed or cooperative manner. Similarly, in some embodiments, the system depicted by FIG. 3 excludes computing device 300, and functionality that would otherwise be implemented by computing device 300 is instead implemented by other components of the system depicted by FIG. 3, such as one or more components of communication network 306 or content server 302 or a combination of the same. In other embodiments, computing device 300 works in conjunction with one or more components of communication network 306 or content server 302 to implement certain functionality described herein in a distributed or cooperative manner.

Computing device 300 includes control circuitry 308, display circuitry 310 and input/output circuitry 312. Control circuitry 308 may be based on any suitable processing circuitry and comprises control circuits and memory circuits, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). Some control circuits may be implemented in hardware, firmware, or software. Control circuitry 308 in turn includes transceiver circuitry 314, storage 316 and processing circuitry 318. In some embodiments, computing device 300 or control circuitry 308 may be configured as varying embodiments of audio/video user entertainment system 100 of FIG. 1.

In addition to control circuitry 308 and 320, computing device 300, content server 302, may each include storage (storage 316 and storage 322, respectively). Each of storages 316 and 322 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each storage 316 and 322 may be used to store various types of content, metadata, and/or other types of data (e.g., they can be used to record audio questions asked by one or more participants connected to a conference). Non-volatile memory may also be used (e.g., to launch a boot-up routine and other instructions). Cloud-based storage may be used to supplement storages 316 and 322 or instead of storages 316 and 322. In some embodiments, the user profile activity history, user profile preferences, and accessible media content may be stored in one or more of storages 316 and 322.

In some embodiments, control circuitry 320 and/or 308 executes instructions for an application stored in memory (e.g., storage 322 and/or storage 316). Specifically, control circuitry 320 and/or 308 may be instructed by the application to perform the functions discussed herein. In some implementations, any action performed by control circuitry 320 and/or 308 may be based on instructions received from the application. For example, the application may be implemented as software or a set of executable instructions that may be stored in storage 322 and/or 316 and executed by control circuitry 320 and/or 308. In some embodiments, the application may be a client/server application where only a client application resides on computing device 300, and a server application resides on content server 302.

The application may be implemented using any suitable architecture. For example, it may be a stand-alone application wholly implemented on computing device 300. In such an approach, instructions for the application are stored locally (e.g., in storage 316), and data for use by the application is downloaded on a periodic basis (e.g., from an out-of-band feed, from an Internet resource, or using another suitable approach). Control circuitry 308 may retrieve instructions for the application from storage 316 and process the instructions to perform the functionality described herein. Based on the processed instructions, control circuitry 308 may determine to execute elements of the embodiments of this disclosure in response to input received from input/output circuitry 312 or from communication network 306. For example, in response to a user providing inputs to activate entertainment system 100, control circuitry 308 may perform the steps of any of the processes depicted in FIGS. 1, 2, and 4-8, or processes relative to various embodiments.

In client/server-based embodiments, control circuitry 308 may include communication circuitry suitable for communicating with an application server (e.g., content server 302) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 306). In another example of a client/server-based application, control circuitry 308 runs a web browser that interprets web pages provided by a remote server (e.g., content server 302). For example, the remote server may store the instructions for the application in a storage device. The remote server may process the stored instructions using circuitry (e.g., control circuitry 308) and/or generate displays. Computing device 300 may receive the displays generated by the remote server and may display the content of the displays locally via display circuitry 310. This way, the processing of the instructions is performed remotely (e.g., by content server 302) while the resulting displays, such as the display windows described elsewhere herein, are provided locally on computing device 300. Computing device 300 may receive inputs from the user via input/output circuitry 312 and transmit those inputs to the remote server for processing and generating the corresponding displays. Alternatively, computing device 300 may receive inputs from the user via input/output circuitry 312 and process and display the received inputs locally, by control circuitry 308 and display circuitry 310, respectively.

Content server 302 and computing device 300 may transmit and receive content and data such as media content via communication network 306. For example, content server 302 may be a media content provider, and computing device 300 may be a smart television configured to download or stream media content, such as a live news broadcast, from content server 302. Control circuitry 320, 308 may send and receive commands, requests, and other suitable data through communication network 306 using transceiver circuitry 342, 314, respectively. Control circuitry 320, 308 may communicate directly with each other using transceiver circuitry 342, 314, respectively, avoiding communication network 306.

It is understood that computing device 300 is not limited to the embodiments and methods shown and described herein. In nonlimiting examples, computing device 300 may be a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, or any other device, computing equipment, or wireless device, and/or combination of the same capable of suitably displaying and manipulating media content.

Control circuitry 320 and/or 308 may be based on any suitable processing circuitry such as processing circuitry 328 and/or 318, respectively. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor). In some embodiments, control circuitry 320 and/or control circuitry 308 are configured to implement a media content operation system, such as systems, or parts thereof, that perform various processes described and shown in connection with FIGS. 1, 2, and 4-8, and/or systems carrying out the features described and shown relative to FIGS. 1, 2, and 4-8.

Computing device 300 receives user input 332 at input/output circuitry 312. For example, computing device 300 may receive a user input such as a user swipe or user touch, as previously discussed. In some embodiments, computing device 300 is a media device (or player) configured as entertainment system 100, with the capability to access media content. It is understood that computing device 300 is not limited to the embodiments and methods shown and described herein. In nonlimiting examples, computing device 300 may be a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, or any other television equipment, computing equipment, or wireless device, and/or combination of the same.

User input 332 may be received from a user selection-capturing interface that is separate from device 300, such as a remote-control device, trackpad or any other suitable user movement sensitive or capture devices, or as part of device 302, such as a touchscreen of display circuitry 310. Transmission of user input 332 to computing device 300 may be accomplished using a wired connection, such as an audio cable, USB cable, ethernet cable or the like attached to a corresponding input port at a local device, or may be accomplished using a wireless connection, such as Bluetooth, WiFi, WiMAX, GSM, UTMS, CDMA, TDMA, 3G, 4G, 4G LTE, 5G, or any other suitable wireless transmission protocol. Input/output circuitry 312 may comprise a physical input port such as a 3.5 mm audio jack, RCA audio jack, USB port, ethernet port, or any other suitable connection for receiving audio over a wired connection, or may comprise a wireless receiver configured to receive data via Bluetooth, WiFi, WiMAX, GSM, UTMS, CDMA, TDMA, 3G, 4G, 4G LTE, 5G, or other wireless transmission protocols.

Processing circuitry 318 may receive user input 332 from input/output circuitry 312 using communication path 334. Processing circuitry 318 may convert or translate the received user input 332 which may be in the form of gestures or movement, to digital signals. In some embodiments, input/output circuitry 312 performs the translation to digital signals. In some embodiments, processing circuitry 318 (or processing circuitry 328, as the case may be) carries out disclosed processes and methods. For example, processing circuitry 318 or processing circuitry 328 may perform processes of FIGS. 1, 2, and 4-8, respectively.

Processing circuitry 318 may provide requests to storage 316 by communication path 336. Storage 316 may provide requested information to processing circuitry 318 by communication path 338. Storage 316 may transfer, by communication path 338, a request for information to transceiver circuitry 314, which may translate or encode the request for information to a format receivable by communication network 306 before transferring the request for information by communication path 340. Communication network 306 may forward the translated or encoded request for information to transceiver circuitry 342 by communication path 346.

At transceiver circuitry 342, the translated or encoded request for information, received through communication path 346, is translated or decoded for processing circuitry 328, which will provide a response to the request for information (e.g., additional activities associated with an event) based on information available through control circuitry 320 or storage 322, or a combination thereof. The response to the request for information is then provided back to communication network 306 by communication path 350 in an encoded or translated format such that communication network 306, which can forward the encoded or translated response back to transceiver circuitry 314 by communication path 352.

At transceiver circuitry 314, the encoded or translated response to the request for information may be provided directly back to processing circuitry 318 by communication path 356, or may be provided to storage 316, through communication path 358, which then provides the information to processing circuitry 318 by communication path 360. Processing circuitry 318 may also provide a request for information directly to transceiver circuitry 314 though communication path 362, enabling storage 316 to respond to an information request, provided through communication 336, by communication path 360 that storage 316 does not contain information pertaining to the request from processing circuitry 318.

Processing circuitry 318 may process the response to the request received through communication path 356 or 360 and may provide instructions to display circuitry 310 for a notification to be provided to the users through communication path 364. Display circuitry 310 may incorporate a timer for providing the notification or may rely on inputs through input/output circuitry 312 from the user, which are forwarded through processing circuitry 318 through communication path 364, to determine how long or in what format to provide the notification. When display circuitry 310 determines the display has been completed (e.g., media content has completed a playback time or a user has exited out of a recommendation), a notification may be provided to processing circuitry 310 through communication path 366.

The communication paths provided in FIG. 3 between computing device 300, content server 302, communication network 306, and all subcomponents depicted are by way of example and may be modified to reduce processing time or enhance processing capabilities for each step in the processes disclosed herein by one skilled in the art.

Figure 4:
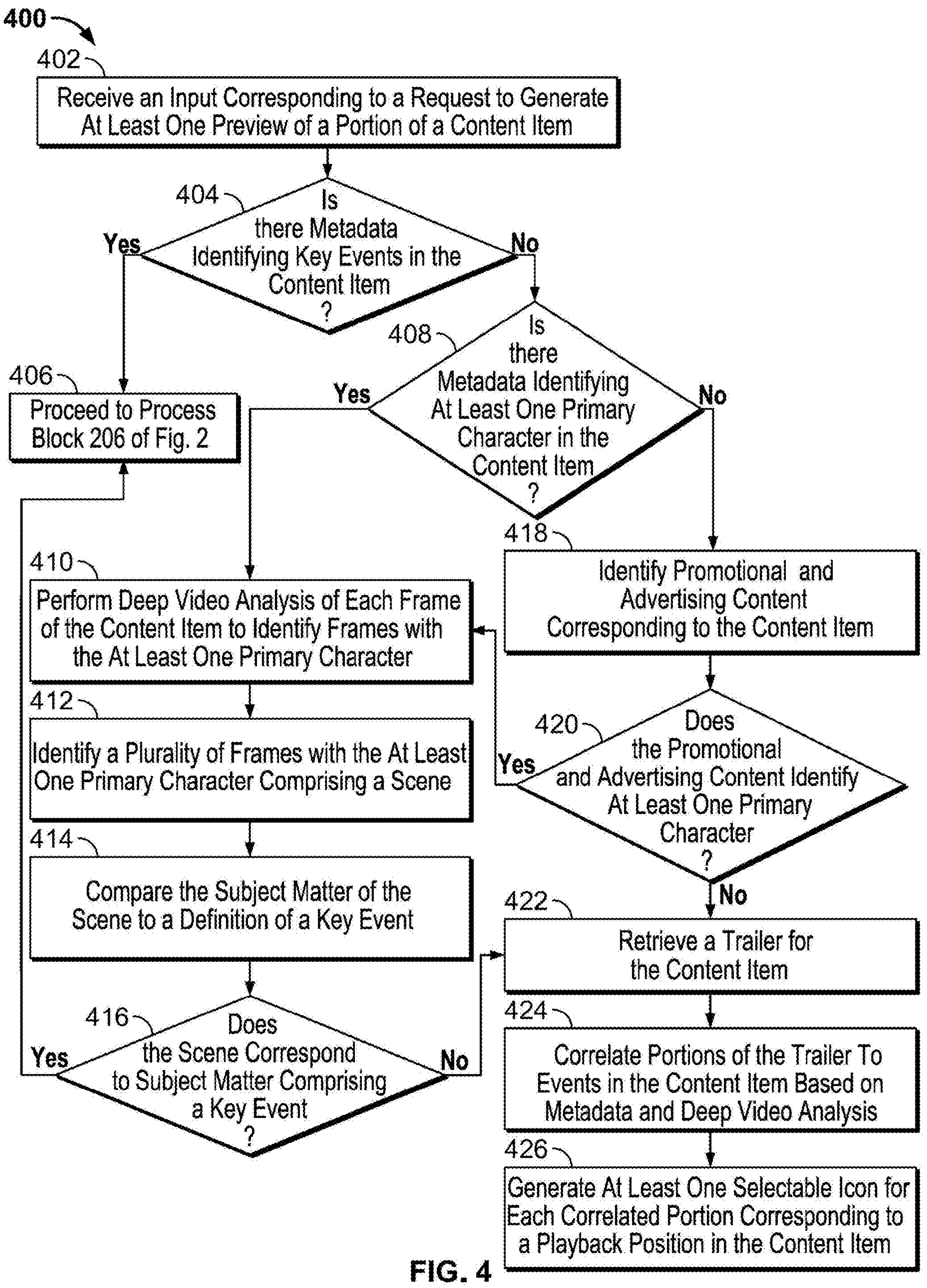
FIG. 4 is a flowchart representing an illustrative process for identifying key events in a content item and generating corresponding selectable icons, in accordance with some embodiments of the disclosure.

FIG. 4 is a flowchart representing key event process 400 for identifying key events in a content item and generating corresponding selectable icons, in accordance with some embodiments of the disclosure. Process 400 may be executed by any or all of the components depicted in FIGS. 1, 3, and 5-7, or described in reference to FIGS. 1, 3, and 5-7. Process 400 may comprise all or fewer of the steps described herein, including example alternative embodiments described herein. Process 400 may be incorporated, in whole or in part, into process 200 of FIG. 2 at process block 206, for example, or process 500 of FIG. 5. It will be understood that the various process and decision blocks may be executed in their totality as shown in process 400 of FIG. 4, may be rearranged in any manner as discerned suitable by one skilled in the art based on computing abilities of a system implemented to execute process 400, and/or may comprise fewer than the steps shown in process 400 of FIG. 4.

At 402, an input is received corresponding to a request to generate at least one preview of a portion of a content item. For example, receiving the input comprises determining the content item is selected for playback. A selection of an icon corresponding to a command to generate the at least one preview of the portion of the content item is received. In response to receiving the selection of the icon, an instruction to identify at least two key events is transmitted. In some embodiments, receiving the input comprises determining the content item is selected for playback and receiving a selection of a trick-play operation icon. In response to receiving the selection of the trick-play operation, an instruction to identify the at least two key events is transmitted. The input may comprise a verbal input, an icon input, a string of characters input, or an input from a communicably coupled device that is communicably coupled to a display where a content item from a content source may be displayed.

At 404, a review of metadata is used to determine if there is metadata corresponding to the content item that identifies key events in the content item. If it is determined that there is metadata identifying key events in the content item (YES at 404), then a current playback position time stamp is determined via process block 206 of FIG. 2 as shown at process block 406 of FIG. 4. Examples of metadata may include virtual or digital flags and tags attached either by a video producer, the video source or a content provider of the video, various strings of characters defining attributes and contributors to a video, and other links indicative of information (e.g., a tag may comprise a link to a website for reviewing movies for a particular movie that is being checked for events). If it is determined that there is not metadata identifying key events in the content item (NO at 404), then the metadata is reviewed for at least one primary character in the content item at 408. For example, a primary character may be a character portrayed by a trending actor or may be a character around whom at least a portion of the narrative of the content item revolves.

If it is determined there is metadata identifying at least one primary character in the content item (YES at 408), then a deep video analysis of each frame of the content item is performed to identify frames with the at least one primary character at 410. At 412, a plurality of frames with the at least one primary character is identified, wherein the plurality of frames comprises a scene corresponding to a narrative followed by the content item. At 414, the subject matter of the scene is reviewed to determine if the scene corresponds to subject matter comprising a key event. If it is determined that the scene corresponds to subject matter comprising a key event (YES at 416), then the process returns to 406, where a current playback position time stamp is determined via process block 206 of FIG. 2 as shown at process block 406 of FIG. 4. If it is determined that the scene does not correspond to subject matter comprising a key event (NO at 416), then a trailer for the content item is retrieved at 422.

If it is determined there is not metadata identifying at least one primary character in the content item (NO at 408), then promotional and advertising content corresponding to the content item is identified at 418. For example, the promotional and advertising content may comprise social network posts or commentary, on-demand advertising, content platform content throttling, and any other known form of promotional and advertising content corresponding to a communication network. If the promotional and advertising content identifies at least one primary character (YES at 420), then a deep video analysis of each frame of the content item is performed to identify frames with the at least one primary character at 410. If the promotional and advertising content does not identify at least one primary character (NO at 420), then a trailer for the content item is retrieved at 422. For example, the trailer may be available on a content platform corresponding to the content item, on a media guidance application utilized to access the content item, or via a communication network accessible by the computing device that received the input to generate at least one preview of the portion of the content item.

At 424, portions of the trailer are correlated to events in the content item based on metadata and deep video analysis. For example, a trailer may show a portion of a significant scene (e.g., as determined by an analysis of the subject matter of the scene as compared to a definition of a key event or as determined by a comparison of the subject matter to elements of a narrative template) that is identified in its entirety in the content item. The significant scene in the content item may then be identified as a key event (e.g., based on criteria defined in reference to FIG. 5). At 426, at least one interactive thumbnail for each correlated portion corresponding to a playback position in the content item is generated. In some embodiments, metadata may be added to the content item or stored in memory in association with the content item (e.g., at a server for the content item, in memory corresponding to a user profile for a user who provided the input, in memory corresponding to a content platform, or in memory or a server corresponding to a media guidance application used to access the content item as shown in system 300 depicted in FIG. 3) wherein the metadata provides readily accessible references to key events identified in the content item to reduce future computing power required to generate the selectable icons corresponding to key events in the content item.

Figure 5:
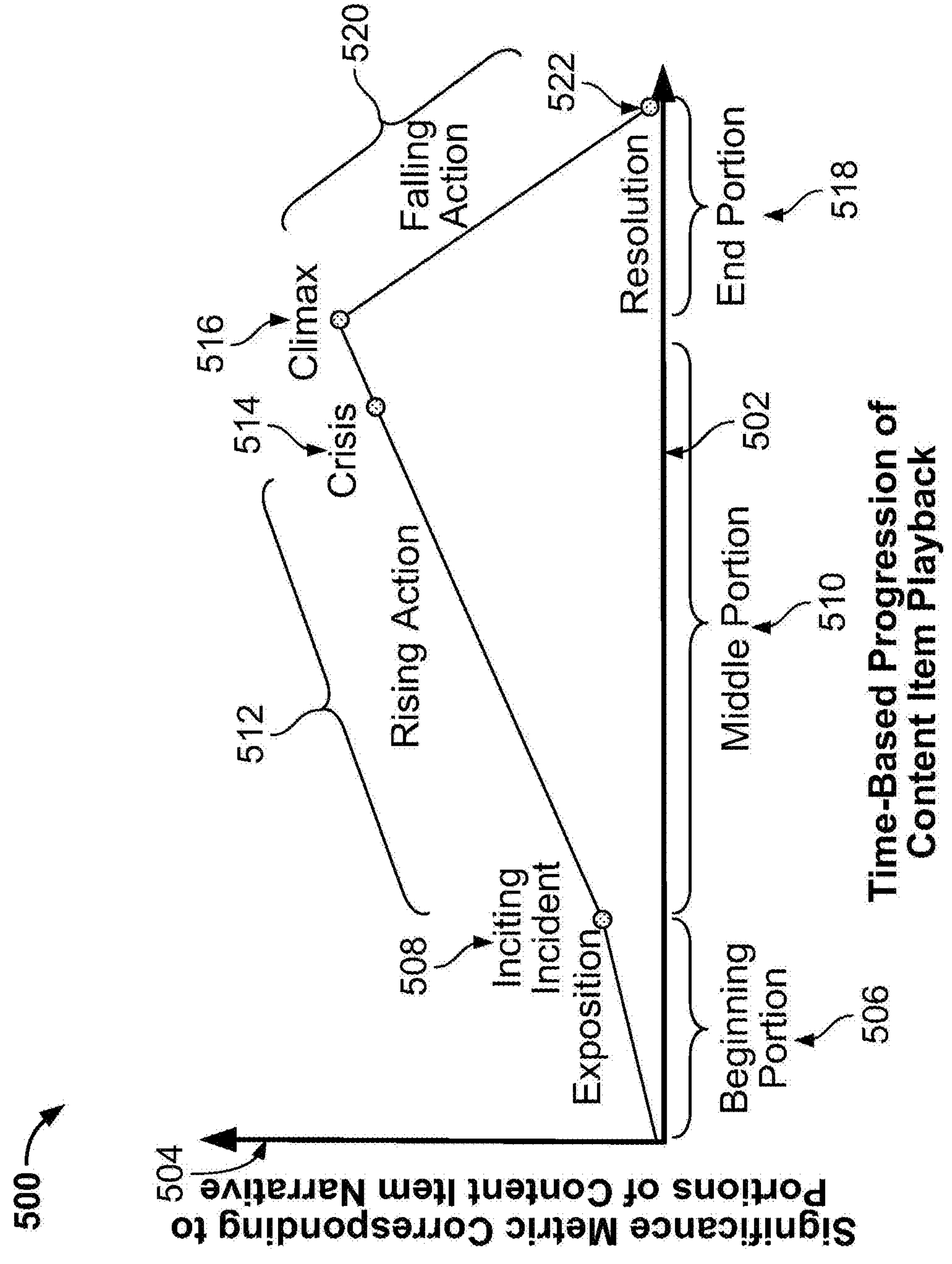
FIG. 5 is an example narrative template utilized to identify key events in a content item, in accordance with some embodiments of the disclosure.

FIG. 5 depicts narrative template 500, which may be utilized to identify key events in a content item, in accordance with some embodiments of the disclosure. Narrative template 500 may be utilized as part of the execution of scenario 100 of FIG. 1, process 200 of FIG. 2, process 400 of FIG. 4, and/or process 500 of FIG. 5. Narrative template 500 may be utilized or stored by any or all of the components depicted in FIGS. 1-4, 6, and 7 or described in reference to FIGS. 1-4, 6, and 7. Narrative template 500 may also comprise alternatives for each of the elements depicted in FIG. 5 as understood by one skilled in the art.

Narrative template 500 corresponds to a template utilized to identify key events in various content items corresponding to an interface associated with at least one content platform. Narrative template 500 may be utilized to identify key events in content items that have not yet been assigned key events, or narrative template 500 may be utilized in combination with profile settings to filter or focus recommended key events to a particular user based on a user's profile. For example, a first user may prefer key events corresponding to significant dialogue (e.g., monologues, confessions, and related story development dialogue) while a second user may prefer key events corresponding to frames comprising action associated with primary characters (e.g., chase or fight scenes). Axis 502 corresponds to a time-based progression of the playback of a content item. Axis 504 corresponds to a significance metric corresponding to each portion of the content item narrative. The metric utilized for axis 504 may be selected by a user (e.g., a preference for dialogue, action, or a combination thereof) and may be defined by any one of a media guidance application, metadata corresponding to a content item, a content platform interface, a content platform administrator, or any combination thereof. For example, a higher significance may be applied by a content platform administrator for dialogue, which may conflict with a user's preference for action. As a result, the user preference setting may filter the key events out that were assigned by the content platform administrator, and narrative template 500 may be utilized to identify key events based on the user's preference.

Narrative template 500 illustrates that narratives in content items typically comprise stories that build in excitement and pace as characters traverse various scenarios. Significance of events may increase over time until a measurable high point is achieved, then narratives typically comprise a measured wind down before terminating the narrative. In some embodiments, a content item may comprise a narrative that does not wind down and instead ends while the action is still rising or at a peak (e.g., in serial programming comprising a plurality of episodes and/or seasons). Narrative template 500 may comprise a detection of a cliffhanger corresponding to this lack of wind down (not pictured).

Narrative template 500 comprises a plurality of story arc elements corresponding to different time-based progress points within a particular content item. Avant-garde content items (e.g., new, unusual, or experimental content items comprising atypical storytelling or narrative progression as understood in the production of content items) may traverse a narrative model in seemingly unpredictable manners. However, it is understood that every narrative corresponding to a content item comprises key events or key story arc elements. Beginning portion 506 corresponds to a narrative portion comprising an exposition. The exposition may comprise elements corresponding to how a story in the content item begins and may set up the remainder of the narrative. For example, beginning portion 506 may introduce the world, the characters, the genre, the theme, or the general feeling of the content item. It is understood that beginning portion 506 typically lacks key events until inciting incident 508, as reflected in FIG. 5 where the significance metric increases at inciting incident 508. Inciting incident 508 may comprise a scene or plurality of frames in the content item something changes (e.g., goes wrong) in the context of the narrative of the content item. For example, a protagonist of the story or primary character may commence a type of journey to reverse or mitigate the impact of inciting incident 508.

A subsequent story arc element of narrative template 500 is middle portion 510. Middle portion 510 corresponds to the time-based progress portion of the content item after beginning portion 506 and subsequent to inciting incident 508. Middle portion 510 comprises rising action 512, wherein anticipation and excitement may linearly or exponentially build (e.g., as determined by the significance metric associated with a particular content item). For example, additional support characters and additional conflicts may create a more in-depth narrative that still follows aspects of beginning portion 506 with increasing significance regarding the overall narrative. Middle portion 510 also comprises crisis 514, which corresponds to a narrative element associated with a peak of conflict between characters or between at least one primary character and their apparent goal as initially established in beginning portion 506. Crisis 514 may correspond to a point in the narrative where a character must succeed, otherwise the narrative terminates without further development.

Middle portion 510 may terminate at climax 516. Climax 516 occurs at an apex of the significance metric, as shown in FIG. 5, often considered the most exciting part of the narrative of the content item or a defining portion of the content item. For example, a primary character may establish an event that must be executed in order to traverse a conflict established at inciting incident 508. Climax 516 may serve as context for the commencement of end portion 518. End portion 518 comprises falling action 520. In some embodiments, end portion 518 is not present, and a content item may only follow narrative template 500 up to climax 516 (e.g., when the content item is a portion of serial programming such as a single episode in a single season, likely not in a final episode of a season), Falling action 520 may comprise a series of events or narrative elements that complement or ramp down the significance metric of each portion of the content item corresponding to rising action 512. For example, if rising action 512 incorporates a journey to a destination followed by falling action 520 may comprise events at the destination as well as indications of where the characters end up after the events at the destination. At the culmination of end portion 518 is resolution 522. Resolution 522 provides an end to the narrative, leaving the at least one primary character in a final state of existence as it pertains to each of beginning portion 506, middle portion 510, and end portion 518. Each of inciting incident 508, crisis 514, climax 516, and resolution 522 may comprise key events in a content item for which selectable icons corresponding to time-based positions in the content item are generated. Additional key events may be identified during each of beginning portion 506, middle portion 510, and end portion 518. These additional key events may be included or excluded based on user profile preferences and/or settings (e.g., as discussed in relation to process 600 of FIG. 6).

Figure 6:
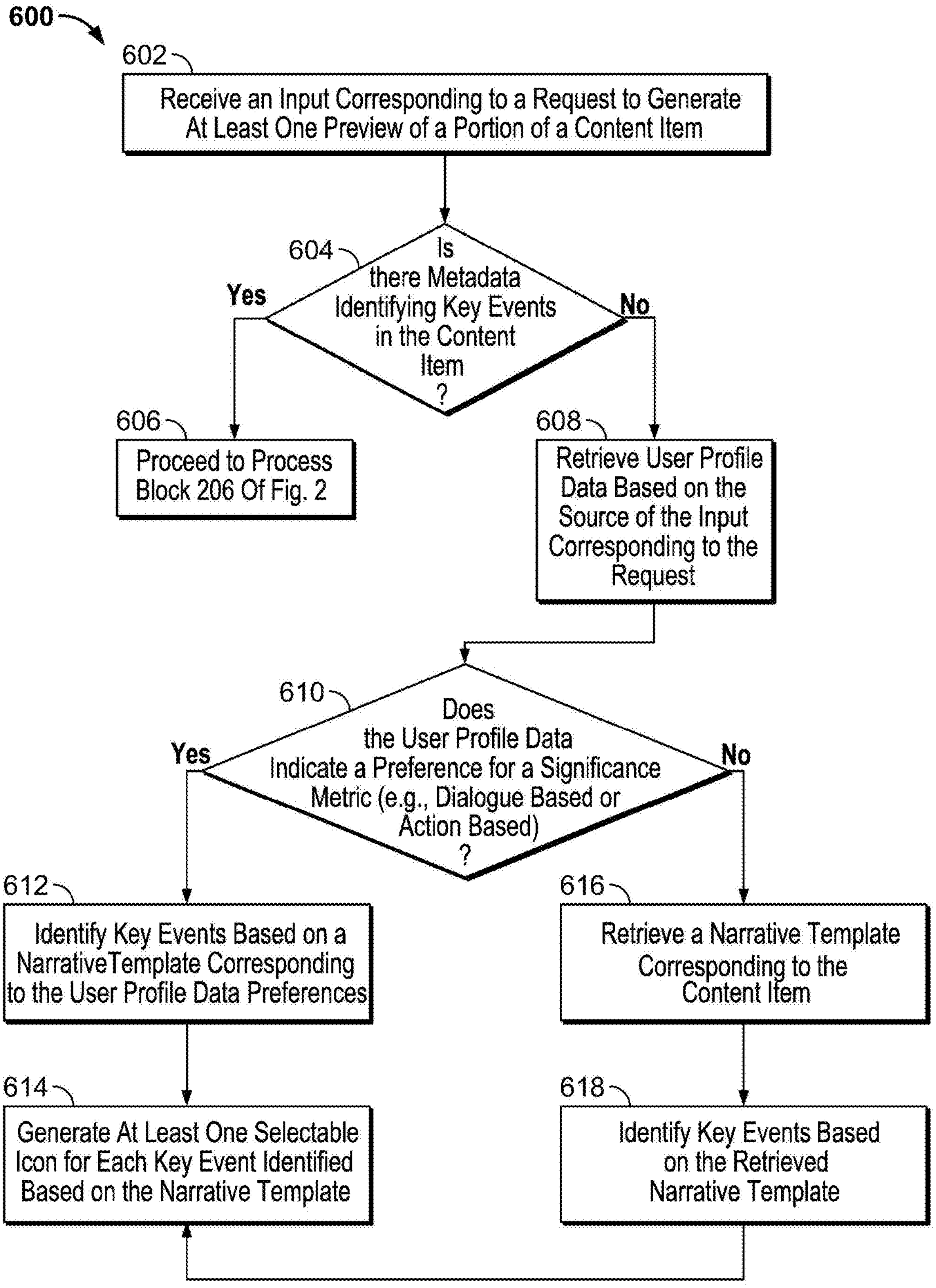
FIG. 6 is a flowchart representing an illustrative process for identifying key events in a content item based on a user profile, in accordance with some embodiments of the disclosure.

FIG. 6 depicts key event identification process 600 for identifying key events in a content item based on a user profile, in accordance with some embodiments of the disclosure. Process 600 may be executed by any or all of the components depicted in FIGS. 1-5 and 7, or described in reference to FIGS. 1-5 and 7. Process 600 may comprise all or fewer of the steps described herein, including example alternative embodiments described herein. Process 600 may be incorporated, in whole or in part, into process 200 of FIG. 2, for example, or process 500 of FIG. 5. It will be understood that the various process and decision blocks may be executed in their totality as shown in process 600 of FIG. 6, may be rearranged in any manner as discerned suitable by one skilled in the art based on computing abilities of a system implemented to execute process 600, and/or may comprise fewer than the steps shown in process 600 of FIG. 6.

At 602, an input is received corresponding to a request to generate at least one preview of a portion of a content item. For example, receiving the input comprises determining the content item is selected for playback. A selection of an icon corresponding to a command to generate the at least one preview of the portion of the content item is received. In response to receiving the selection of the icon, an instruction to identify the at least two key events is transmitted. In some embodiments, receiving the input comprises determining the content item is selected for playback and receiving a selection of a trick-play operation icon. In response to receiving the selection of the trick-play operation, an instruction to identify the at least two key events is transmitted. The input may comprise a verbal input, an icon input, a string of characters input, or an input from a communicably coupled device that is communicably coupled to a display where a content item from a content source may be displayed.

At 604, a review of metadata is used to determine if there is metadata corresponding to the content item that identifies key events in the content item. If it is determined that there is metadata identifying key events in the content item (YES at 604), then a current playback position time stamp is determined via process block 206 of FIG. 2 as shown at process block 606. If it is determined that there is not metadata identifying key events in the content item (NO at 604), user profile data based on the source of the input corresponding to the request is retrieved at 608. For example, an active user profile may be correlated to the input. In some embodiments, the input may be received by an audio input, and the user profile is identified based on biometric authentication. In some embodiments, a user may have provided authentication credentials (e.g., a form of a username and password) to log in to either a content platform or an application corresponding to at least one content platform. The authentication credentials may be correlated to a user profile, which has user preference data and user settings corresponding to at least one of a viewing history, a key event preference, and other interface settings (e.g., the user prefers icons with time stamps, images, certain languages, or videos corresponding to key events).

At 610, a review of user profile data is used to determine if the user profile data indicates a preference for a significant metric in order to identify key events in a content item (e.g., a user may have profile data based on viewing history or settings which indicate a preference for dialogue or a preference for actions scenes or scenes of varying genres). If it is determined that the user profile data indicates a preference for a significance metric (YES at 610), key events are identified based on a narrative template corresponding to the user profile data preferences at 612. The narrative template may, for example, follow a particular set of story elements for content associated with a preferred genre of the user. The narrative template may be generated or may be retrieved from any device or source accessible by the described system. The narrative template may be used to score various portions of a content item and then the highest or closest scoring portions (e.g., as scored in comparison to respective aspects of the narrative template) may be flagged as key events. Multiple portions may be compared to various aspects of the narrative template, in order to identify the closest matching key events. Additionally, there may be a threshold minimum required key events identified (e.g., via a profile setting) and the scoring may be raised or lowered to accommodate profile settings.

At 614, at least one interactive thumbnail for each key event identified based on the narrative template is generated. If it is determined that the user profile data does not indicate a preference for a significance metric (NO at 610), key events are identified based on a narrative template corresponding to the content item at 616. For example, a content platform may have a narrative template assigned to the content item based on a genre or other content item characteristic such that key events are appropriately identified based on the subject matter of the content item. At 618, key events are identified based on the retrieved narrative template.

Figure 7:
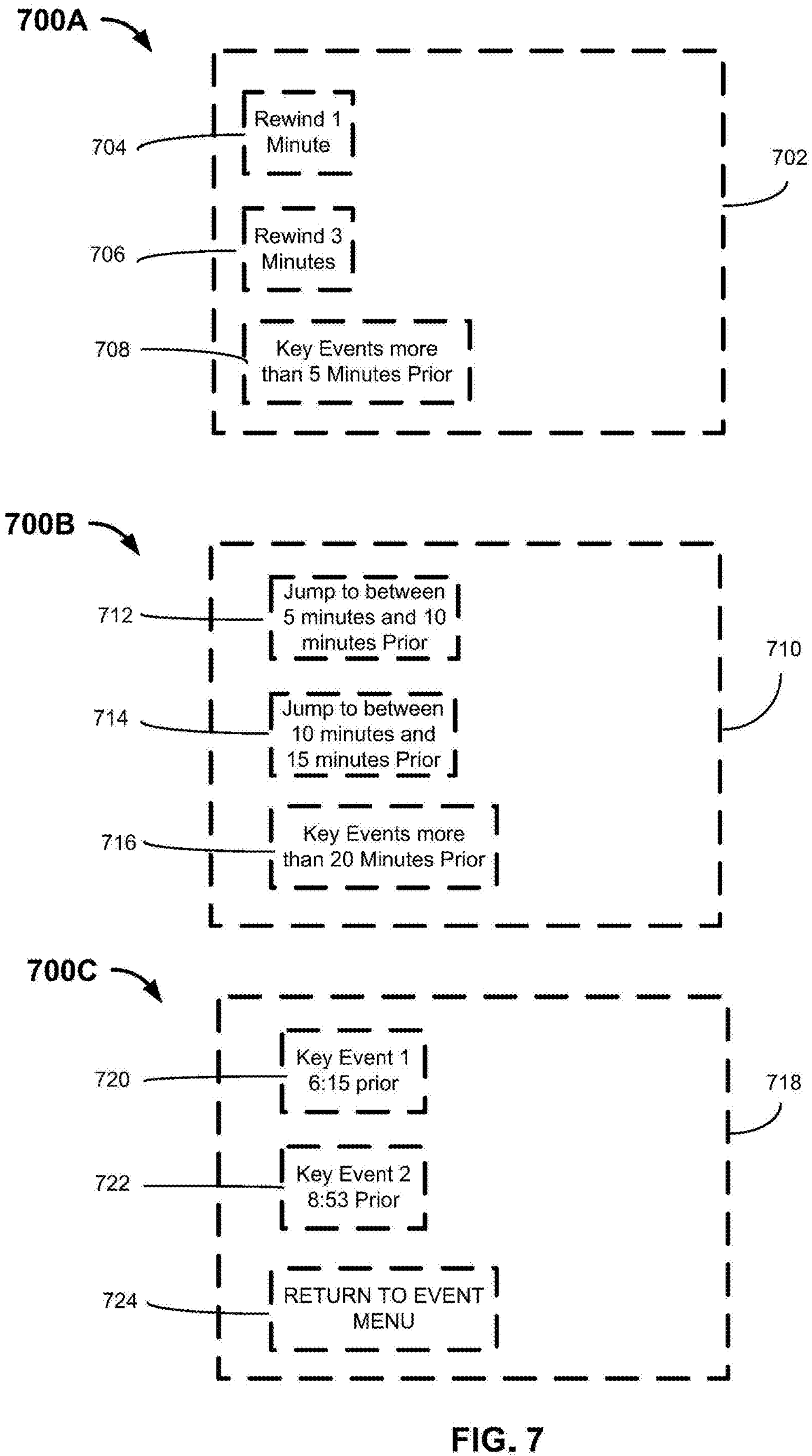
FIG. 7 shows multiple examples of interactive displays with interactive key event identifying icons, in accordance with some embodiments of the disclosure.

FIG. 7 depicts interactive key event displays or user interfaces 700A, 700B, and 700C, each comprising respective interactive key event identifying icons, in accordance with some embodiments of the disclosure. Each of key event displays 700A, 700B, and 700C may be generated by any or all of the components depicted in FIGS. 1-6, or described in reference to FIGS. 1-6. Each of key event displays 700A, 700B, and 700C may comprise all or fewer of the elements described herein, including example alternative embodiments described herein. Each of process 200 of FIG. 2, process 500 of FIG. 5, and process 600 of FIG. 6 may be used, at least in part, to generate each of key event displays 700A, 700B, and 700C.

Key event display 700A comprises overlay 702 on which each of icons 704, 706, and 708 are generated. Icon 704 corresponds to an option that, when selected, causes the content item to rewind or fast forward or skip rearward a first amount of time from a current playback progress point (e.g., 1 minute, 1 minutes 30 seconds, or 3 minutes 25 seconds) to enable a user to view a first detected key event within a first range of time from the current playback position (e.g., within 5 minutes of the current playback progress point). The intervals for skipping through the content item may be standard intervals (e.g., whole minutes) or may be intermittent time periods (e.g., minutes and seconds) depending on the user profile settings related to a particular content item. Icon 706 corresponds to a second option that, when selected, causes the content item to rewind or fast forward or skip rearward a second larger amount of time from a current playback progress point (e.g., 3 minutes) to enable a user to view a first detected key event within a first range of time from the current playback position (e.g., within 5 minutes of the current playback progress point). Icon 708 corresponds to an option that, when selected, enables a viewer to see a list of key events beyond the first range of time from the current playback position (e.g., there may be more key events in the content prior that are more than 5 minutes prior to a current playback position). Each of the settings for these icons or the icons themselves may be updated based on manual inputs or via updates to a user preferences stored in relationship to a user profile. The icons may be generated based on default settings and may be modified based on a particular user's preferences. In an embodiment, key element display 700A is provided in response to an initial input to generate at least one interactive thumbnail (e.g., at block 202 of FIG. 2).

Key event display 700B comprises overlay 710, similar to overlay 702, on which each of icons 712, 714, and 716 are generated. Icon 712 corresponds to an option that, when selected, causes the content item to jump to or provide a preview of key events within a first window of time preceding a current playback progress point (e.g., key events within a window starting 5 minutes prior to a current playback position and ending 10 minutes prior to a current playback position) to enable a user to view a first set of key events within a first range of time from the current playback position which may assist in a user recalling a last known aspect of a content item. Icon 714 corresponds to an option that, when selected, causes the content item to jump to or provide a preview of key events within a second window of time preceding a current playback progress point (e.g., key events within a window starting 10 minutes prior to a current playback position and ending 15 minutes prior to a current playback position) to enable a user to view a second set of key events within a second range of time from the current playback position which may assist in a user recalling a last known aspect of a content item. The difference between the first window and the second window may be based on a default setting, a user activity history, or a user preference setting with respect to each of these selectable icons. Icon 716 corresponds to an option that, when selected, enables a viewer to see an interactive menu or a list of key events beyond the range of time from the current playback position covered by each of icons 712 and 714 (e.g., there may be more key events in the content prior that are more than 20 minutes prior to a current playback position). Each of the settings for these icons or the icons themselves may be updated based on manual inputs or via updates to a user preferences stored in relationship to a user profile. The icons may be generated based on default settings and may be modified based on a particular user's preferences. Key event display 700B may, for example, be generated in response to selecting icon 708 of key event display 700A.

Key event display 700C comprises overlay 718, also similar to overlays 702 and 710, on which each of icons 720, 722, and 724 are generated. Icon 720 corresponds to an option that, when selected, causes the content item to rewind or fast forward or skip rearward from a current playback progress point to a particular time stamp corresponding to a first key event (e.g., an event that starts 6 minutes and 15 seconds prior) to enable a user to view a first detected key event prior to the current playback position. Icon 722 corresponds to a second option that, when selected, causes the content item to rewind or fast forward or skip rearward to a second key event at a second time stamp prior to a current playback progress point (e.g., an event that starts 8 minutes and 53 seconds prior) to enable a user to view a second detected key event prior to the current playback position. The range of time for generating each of icons 720 and 722 may be based on a window of time selected via icons of key event display 700B. Icon 724 corresponds to an option that, when selected, enables a viewer to return to key event display 700A or 700B, for example. Alternatively, the user may be directed to a menu or list of all key events in the content item such that the user may review enough events to refresh their memory and select an optimum key event to resume playback of the content item. Each of the settings for these icons or the icons themselves may be updated based on manual inputs or via updates to a user preferences stored in relationship to a user profile. The icons may be generated based on default settings and may be modified based on a particular user's preferences.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be illustrative and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

While some portions of this disclosure may refer to "convention" or examples, any such reference is merely to provide context to the instant disclosure and does not form any admission as to what constitutes the state of the art.

What is claimed is:

1. A method comprising:
- generating for display a content item;
- receiving, via a user interface, an input to control playing of the content item; and
- based at least in part on the receiving of the input to control playing of the content item:
  - accessing a narrative model for the content item, wherein the narrative model is generated by performing a deep video analysis of a plurality of frames of the content item;
  - identifying a plurality of key events within the content item based on the accessed narrative model, wherein each key event of the plurality of key events is associated with a respective play position of the content item;
  - generating for display an overlay over the display of the content item comprising a plurality of key event indicators based at least in part on the identified plurality of key events, wherein:
    - each respective key event indicator of the plurality of key event indicators is selectable to cause the content item to play from a respective play position associated with the respective key event indicator.

2. The method of claim 1, wherein the narrative model is associated with a user profile, and wherein the user profile includes a preferred type of narrative model.

3. The method of claim 1, wherein the narrative model comprises a plurality of story arc elements, wherein at least one key event is associated with each story arc element of the plurality of story arc elements.

4. The method of claim 3, wherein the plurality of story arc elements comprises: an inciting incident; a rising action; a crisis; a climax; and a falling action.

5. The method of claim 3, wherein identifying the plurality of key events comprises performing the deep video analysis of each of a plurality of frames of the content item to identify frames corresponding to each story arc element of the plurality of story arc elements.

6. The method of claim 5, wherein the deep video analysis of each of a plurality of frames of the content item is performed while the content item is displayed.

7. The method of claim 1, wherein the plurality of key event indicators comprises descriptive information corresponding to each of the plurality of key events, and wherein each of the plurality of key event indicators further correspond to a respective video or image preview of a portion of the content item corresponding to each of the plurality of key events.

8. The method of claim 1, wherein identifying the plurality of key events comprises:
- identifying a user profile corresponding to the input;
- determining, based on the user profile, viewing preferences associated with the user profile; and
- identifying the plurality of key events based on the viewing preferences.

9. The method of claim 8, wherein a portion of the plurality of key events are not used to generate a key event indicator based on the viewing preferences.

10. The method of claim 1, wherein the overlay includes a timeline, and wherein the plurality of key event indicators are arranged sequentially along the timeline in an order in which they occur in the content item.

11. A system comprising:
- input/output circuitry configured to display content items for playback based on inputs correspond to selectable icons; and
- control circuitry configured to:
  - generate for display a content item;
  - receive, via a user interface, an input to control playing of the content item; and
  - based at least in part on the receiving of the input to control playing of the content item:
    - access a narrative model for the content item, wherein the narrative model is generated by performing a deep video analysis of a plurality of frames of the content item;
    - identify a plurality of key events within the content item based on the accessed narrative model, wherein each key event of the plurality of key events is associated with a respective play position of the content item;
    - generate for display an overlay over the display of the content item comprising a plurality of key event indicators based at least in part on the identified plurality of key events, wherein:
      - each respective key event indicator of the plurality of key event indicators is selectable to cause the content item to play from a respective play position associated with the respective key event indicator.

12. The system of claim 11, wherein the narrative model is associated with a user profile, and wherein the user profile includes a preferred type of narrative model.

13. The system of claim 11, wherein the narrative model comprises a plurality of story arc elements, wherein at least one key event is associated with each story arc element of the plurality of story arc elements.

14. The system of claim 13, wherein the plurality of story arc elements comprises: an inciting incident; a rising action; a crisis; a climax; and a falling action.

15. The system of claim 13, wherein identifying the plurality of key events comprises performing the deep video analysis of each of a plurality of frames of the content item to identify frames corresponding to each story arc element of the plurality of story arc elements.

16. The system of claim 15, wherein the deep video analysis of each of a plurality of frames of the content item is performed while the content item is displayed.

17. The system of claim 11, wherein the plurality of key event indicators comprises descriptive information corresponding to each of the plurality of key events, and wherein each of the plurality of key event indicators further correspond to a respective video or image preview of a portion of the content item corresponding to each of the plurality of key events.

18. The system of claim 11, wherein the control circuitry is further configured to:

identify a user profile corresponding to the input;

determine, based on the user profile, viewing preferences associated with the user profile; and identify the plurality of key events based on the viewing preferences.

19. The system of claim 18, wherein a portion of the plurality of key events are not used to generate a key event indicator based on the viewing preferences.

20. A non-transitory computer readable medium having non-transitory computer-readable instructions encoded thereon, when executed by control circuitry, cause the control circuitry to:

generate for display a content item;

receive, via a user interface, an input to control playing of the content item; and based at least in part on the receiving of the input to control playing of the content item:

access a narrative model for the content item;

identify a plurality of key events within the content item based on the accessed narrative model, wherein each key event of the plurality of key events is associated with a respective play position of the content item;

generate for display an overlay over the display of the content item comprising a plurality of key event indicators based at least in part on the identified plurality of key events, wherein:

each respective key event indicator of the plurality of key event indicators is selectable to cause the content item to play from a respective play position associated with the respective key event indicator.

* * * * *